United States Patent
Tsai et al.

(10) Patent No.: US 10,743,321 B2
(45) Date of Patent: Aug. 11, 2020

(54) DEFAULT BEAM FOR UPLINK TRANSMISSION AFTER BEAM FAILURE RECOVERY

(71) Applicant: MEDIATEK INC., Hsin-Chu (TW)

(72) Inventors: Cheng-Rung Tsai, Hsin-Chu (TW);
Ming-Po Chang, Hsin-Chu (TW);
Chia-Hao Yu, Hsin-Chu (TW);
Weidong Yang, San Jose, CA (US);
Jiann-Ching Guey, Hsin-Chu (TW)

(73) Assignee: MEDIATEK INC, Hsin-Chu (TW)

( * ) Notice: Subject to any disclaimer, the term of this patent is extended or adjusted under 35 U.S.C. 154(b) by 0 days.

(21) Appl. No.: 16/282,851

(22) Filed: Feb. 22, 2019

(65) Prior Publication Data

US 2019/0268893 A1    Aug. 29, 2019

Related U.S. Application Data

(60) Provisional application No. 62/634,792, filed on Feb. 23, 2018.

(51) Int. Cl.
| | |
|---|---|
| *H04W 72/04* | (2009.01) |
| *H04W 16/28* | (2009.01) |
| *H04W 74/08* | (2009.01) |
| *H04W 76/19* | (2018.01) |
| *H04B 7/08* | (2006.01) |
| *H04B 7/06* | (2006.01) |

(52) U.S. Cl.
CPC ........ *H04W 72/046* (2013.01); *H04B 7/0695* (2013.01); *H04B 7/088* (2013.01);
(Continued)

(58) Field of Classification Search
CPC ... H04W 72/046; H04W 76/19; H04W 16/28; H04W 74/0833; H04B 7/0695; H04B 7/088

See application file for complete search history.

(56) References Cited

U.S. PATENT DOCUMENTS

| | | |
|---|---|---|
| 2017/0302355 A1 | 10/2017 | Islam et al. |
| 2017/0331577 A1 | 11/2017 | Parkvall et al. |

(Continued)

FOREIGN PATENT DOCUMENTS

| | | |
|---|---|---|
| EP | 3264631 A1 | 1/2018 |
| WO | WO2017024516 A1 | 2/2017 |

(Continued)

OTHER PUBLICATIONS

International Search Report and Written Opinion of International Search Authority for PCT/CN2019/075912 dated May 13, 2019 (11 pages).

(Continued)

*Primary Examiner* — Melvin C Marcelo
(74) *Attorney, Agent, or Firm* — Imperium Patent Works; Zheng Jin

(57) ABSTRACT

A method of default uplink beam determination after a beam failure recovery (BFR) procedure in a beamforming system is proposed. For uplink (UL) transmission, the BS provides physical uplink control channel (PUCCH) resource configuration to UE. The configuration includes spatial relation information that indicates the spatial filter to be used by UE for the corresponding PUCCCH transmission. After BFR procedure is completed and before the first spatial relation information indication for a PUCCH resource is received by UE, a default UE TX beam for the PUCCH resource can be determined based on the UE TX beam used during the BFR procedure, e.g., the UE TX beam used to transmit a beam failure recovery request (BFRQ) during the BFR procedure.

20 Claims, 4 Drawing Sheets

(52) U.S. Cl.
CPC ....... *H04W 16/28* (2013.01); *H04W 74/0833* (2013.01); *H04W 76/19* (2018.02)

(56) References Cited

U.S. PATENT DOCUMENTS

| | | | |
|---|---|---|---|
| 2018/0006770 A1 | 1/2018 | Guo et al. | |
| 2018/0219604 A1 | 8/2018 | Lu et al. | |
| 2019/0268961 A1* | 8/2019 | Tsai | H04B 7/0695 |
| 2019/0312698 A1* | 10/2019 | Akkarakaran | H04B 7/0695 |
| 2019/0394762 A1* | 12/2019 | Tang | H04W 74/0833 |

FOREIGN PATENT DOCUMENTS

| | | |
|---|---|---|
| WO | WO2017180334 A1 | 10/2017 |
| WO | WO2017180336 A1 | 10/2017 |
| WO | WO2017196612 A1 | 11/2017 |

OTHER PUBLICATIONS

Taiwan IPO, office action for the TW patent application 108106089 (no English translation is available) dated Nov. 29, 2019 (9 pages).
R1-1716351 3GPP TSG-RAN WG1 NR Ad Hoc #3, Ericsson, "Basic beam recovery", Nagoya, Japan, Sep. 18-21, 2017 (9 pages) *section 2.2-2.4*.
R1-1800699 3GPP TSG RAN Wg1 Meeting AH 1801, Ericsson, "Remaining details on beam management", Vancouver, Canada, Jan. 22-26, 2018 (6 pages) *section 2.1*.
R1-1801006 3GPP TSG RAN WG1 Meeting AH 1801, Ericsson, "Feature lead summary 1 of beam measurement and reporting", Vancouver, Canada, Jan. 22-26, 2018 (12 pages) *section 4.4*.
R1-1801089 3GPP TSG RAN WG1 Meeting #AH1801, MediaTek Inc., "Summary for Remaining issues on Beam Failure Recovery", Vancouver, Canada, Jan. 22-26, 2018 (17 pages) *section 2.1*.

* cited by examiner

DEFAULT BEAM FOR UPLINK TRANSMISSION AFTER BEAM FAILURE RECOVERY

CROSS REFERENCE TO RELATED APPLICATIONS

This application claims priority under 35 U.S.C. § 119 from U.S. Provisional Application No. 62/634,792, entitled "Default Beam for UL Transmission in Transition Phase," filed on Feb. 23, 2018, the subject matter of which is incorporated herein by reference.

TECHNICAL FIELD

The disclosed embodiments relate generally to wireless communication, and, more particularly, to default beam selection for uplink transmission in transition phase such as after beam failure recovery procedure.

BACKGROUND

The bandwidth shortage increasingly experienced by mobile carriers has motivated the exploration of the under-utilized Millimeter Wave (mmWave) frequency spectrum between around 30G and 300G Hz for the next generation broadband cellular communication networks. The available spectrum of mmWave band is hundreds of times greater than the conventional cellular system. The mmWave wireless network uses directional communications with narrow beams and can support multi-gigabit data rate. The under-utilized bandwidth of the mmWave spectrum has very small wavelengths, which enables large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam management and beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. Beam failure recovery mechanism is designed to handle the rare case beam tracking issue, e.g., when feedback rate for beam management and beam training may not be frequent enough. When beam failure is detected, UE triggers a beam failure recovery procedure and identifies a candidate beam for beam failure recovery (BFR). UE then starts beam failure recovery request (BFRQ) transmission on physical random-access channel (PRACH) resource corresponding to the identified candidate beam.

After beam failure recovery procedure and before the first uplink control beam indication is completed signaled from the network, UE does not know which TX beam can be used to transmit both physical uplink control channel (PUCCH) and physical uplink shared channel (PUSCH) when UE is required to do uplink transmission. A solution is sought to define a default UE TX beam during such transition phase.

SUMMARY

A method of default uplink beam determination after a beam failure recovery (BFR) procedure in a beamforming system is proposed. For uplink (UL) transmission, the BS provides physical uplink control channel (PUCCH) resource configuration to UE. The configuration includes spatial relation information that indicates the spatial filter to be used by UE for the corresponding PUCCCH transmission. After BFR procedure is completed and before the first spatial relation information indication for a PUCCH resource is received by UE, a default UE TX beam for the PUCCH resource can be determined based on the UE TX beam used during the BFR procedure, e.g., the UE TX beam used to transmit a beam failure recovery request (BFRQ) during the BFR procedure.

In one embodiment, a UE detects a beam failure and identifies one or more new candidate beams in a beamforming communication network. The UE initiates a beam failure recovery (BFR) procedure using one new candidate beam selected from the one or more new candidate beams. The UE determines a default spatial filter for uplink transmissions after the BFR procedure is completed. Finally, the UE performs a physical uplink control channel (PUCCH)-transmission on a PUCCH resource using the default spatial filter before receiving a first spatial relation information indication from the network for the PUCCH resource.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
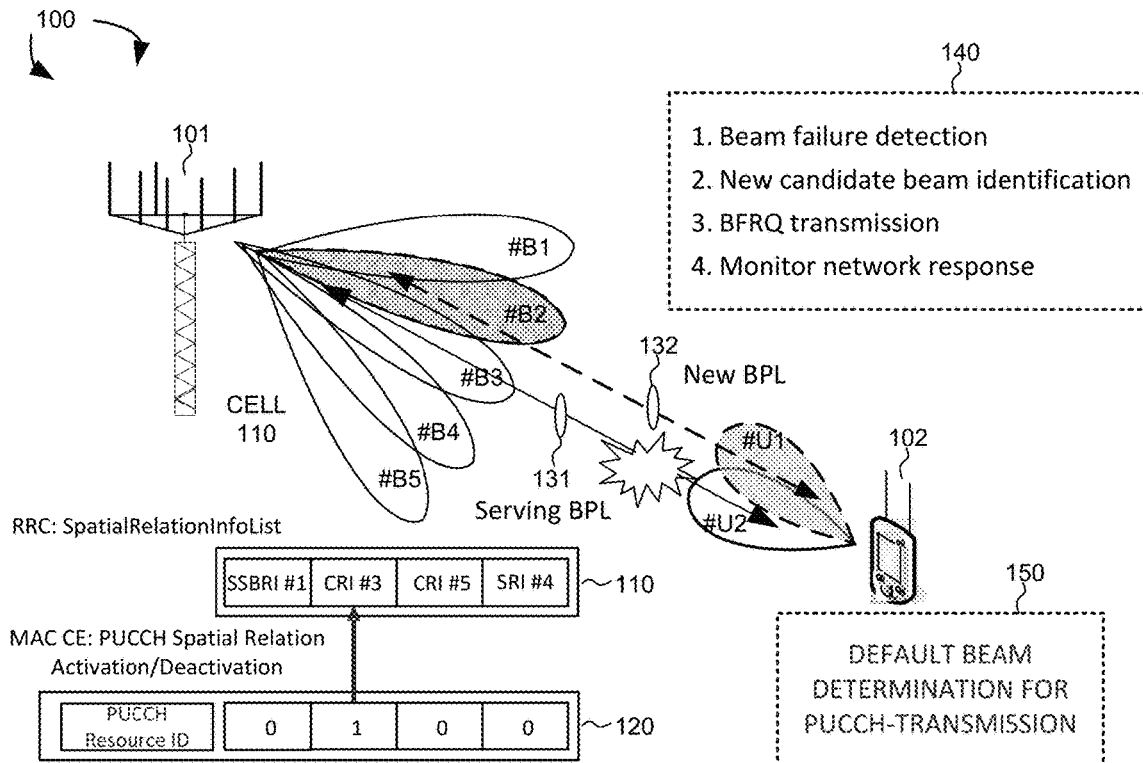
FIG. 1 illustrates a beamforming wireless communication system and default uplink beam for physical uplink control channel (PUCCH) transmission after beam failure recovery procedure is completed and before a first spatial relation information indication is received by UE in accordance with one novel aspect.

FIG. 1 illustrates a beamforming wireless communication system 100 and default uplink beam for physical uplink control channel (PUCCH) transmission after beam failure recovery procedure but before dedicated UL beam indication in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams #B1, #B2, #B3, #B4, and #B5. The collection of the BS beams #B1-#B5 covers an entire service area of cell 110. Similarly, UE 102 may also apply beamforming to form multiple UE beams, e.g., #U1, #U2. For beamformed access, both ends of a link need to know which beamformers to use, e.g., a serving beam pair link (BPL) 131 for communication between BS 101 #B3 and UE 102 #U2.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems, or synchronization signal block (SSB) in NR systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

Beam management and beam training mechanism, which includes both initial beam alignment and subsequent beam tracking, ensures that base station (BS) beam and user equipment (UE) beam are aligned for data communication. For uplink (UL) transmission, the base station provides physical uplink control channel (PUCCH) resource configuration(s) to UE to configure one or multiple PUCCH resources. In addition to PUCCH format, first symbol, duration, PRB offset, and cyclic shift for each PUCCH resource, the PUCCH resource configuration further comprises the spatial relation information for the PUCCH(s). The spatial relation information indicates the spatial filter (e.g., TX beam) to be used by UE for the corresponding PUCCCH transmission.

As depicted in FIG. 1, a spatial relation information, e.g., a spatial relation between a spatial filter for a PUCCH resource and a spatial filter for a reference signal resource, can be indicated by radio resource control (RRC) signaling or RRC+MAC control element (CE). In one example, a SpatialRelationInfoList, which contains one or more PUCCH-SpatialRelationInfo Information Elements (IEs), is configured in a PUCCH resource configuration via RRC signaling. Each PUCCH-SpatialRelationInfo IE can include a synchronization signal block (SSB) resource indicator (SSBRI), a channel state information reference signal (CSI-RS) resource indicator (CRI), or a sounding reference signal (SRS) resource indicator (SRI), to indicate the spatial filter (e.g., the UE TX beam) to be used by UE associated to the corresponding PUCCH transmission. When the number of PUCCH-SpatialRelationInfo IEs in SpatialRelationInfoList is more than one, then a MAC CE is used to point to one of the PUCCH-SpatialRelationInfo IEs for indicating spatial relation information for a PUCCH resource. In the example of FIG. 1, the SpatialRelationInfoList 110 contains at most four PUCCH-SpatialRelationInfo IEs including SSB#1, CRI#3, CRI#5, and SRI#4. A MAC CE 120 including a four-bit bitmap and a PUCCH resource ID for PUCCH spatial relation activation, with a second bit of the bitmap having value 1, is then used to indicate that UE 102 can assume a spatial relation between a spatial filter for CRI#3 and a spatial filter for UE PUCCH transmission on a PUCCH resource indicated by the PUCCH resource ID.

To ensure beam alignment, beam-tracking operation should be adapted in response to channel changes. A beam failure recovery (BFR) mechanism as depicted by 140 is designed to handle the rare case beam tracking issue, e.g., when feedback rate for beam management and beam training may not be frequent enough. When beam failure on all serving links for control channels (e.g., serving BPL 131) is detected (step 1), UE 102 identifies one or more new candidate beams (step 2) for beam failure recovery. Note that beam failure detection (step 1) and new candidate beam identification (step 2) can be performed sequentially or simultaneously. UE 102 then initiates a BFR procedure (step 3) and starts a beam failure recovery request (BFRQ) transmission on a dedicated physical random-access channel (PRACH) resource corresponding to one of the identified new candidate beams (e.g., new BPL 132). In step 4, UE 102 monitors network response to decide whether the BFR procedure is completed.

After the BFR procedure succeeds and before a first spatial relation information for the PUCCH is received by UE 102, UE 102 does not know which spatial filter or TX beam can be used to transmit the PUCCH when UE 102 is required to deliver UL control information. In accordance with one novel aspect, as depicted by 150 of FIG. 1, a default UE TX beam can be determined based on the UE TX beam used during the BFR procedure. In one embodiment, UE 102 selects a new candidate beam from the identified new candidate beams, and transmits a BFRQ to the network over a dedicated PRACH resource associated to the selected new candidate beam using the UE beam #U1. The default UE TX beam is determined to be the same as the UE beam used for the last PRACH transmission. UE 102 transmits the PUCCH as the PRACH transmission using the same spatial filter (e.g., the default spatial filter) as for the last PRACH transmission.

Figure 2:
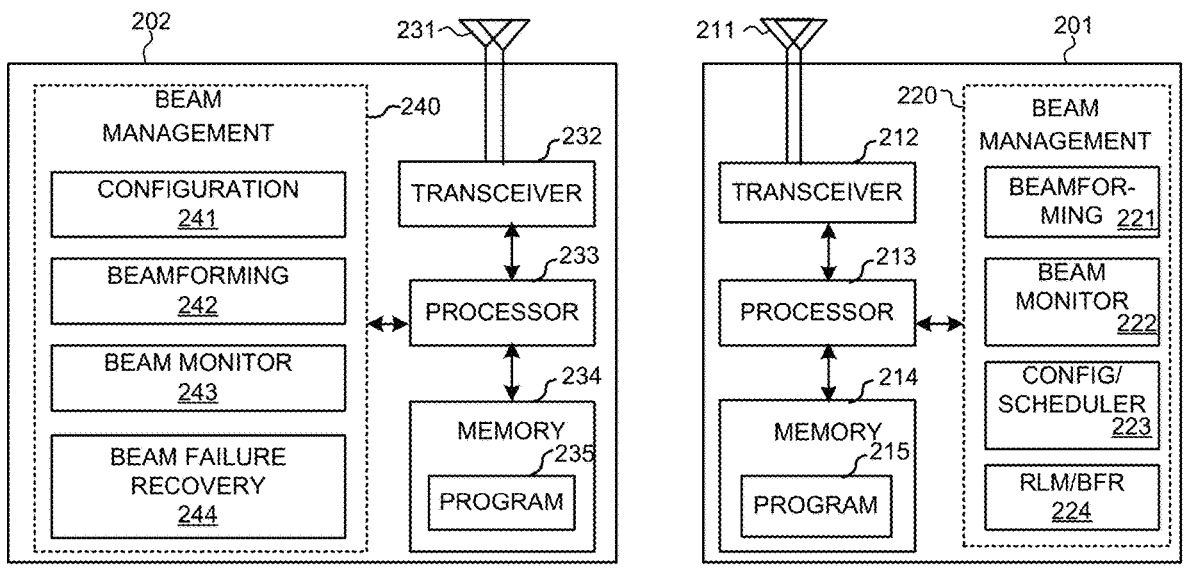
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam management module 220, which further comprises a beamforming circuit 221, a beam monitoring circuit 222, a config and scheduling circuit 223, and an RLM/BFR handling circuit 224. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Config and scheduling circuit 223 schedules uplink transmission for UEs and configures radio resources and spatial filters for uplink transmission. RLM handling circuit 224 performs physical layer radio link monitor and beam failure recovery functionality.

Similarly, UE 202 comprises a beam management module 240, which further comprises a configuration circuit 241, a beamforming circuit 242, a beam monitor circuit 243, and a beam failure recovery handling circuit 244. Configuration circuit 241 receives beam failure recovery configuration from BS 201, which includes beam failure recovery trigger conditions, beam failure recovery resources, and UE monitor/report behavior. The configuration information may further comprise PUCCH resource and spatial relation information for UL control beam indication. Beamforming circuit 242 may belong to part of the RF chain, which applies various beamforming weights to multiple antenna elements of antenna 231 and thereby forming various beams. Beamforming circuit 242 also determines default UE TX beam during a time window of a transition phase, e.g., from BFR procedure is completed to the first spatial relation information indication for a PUCCH resource is received. Beam monitor 243 monitors received radio signals and performs measurements of the radio signals over the various beams. Beam monitor 243 can detect beam failure of existing serving beams as well as identify new candidate beams. Beam failure recovery circuit 244 performs BFR procedure by transmitting BFRQ to the network and receive network response.

Figure 3:
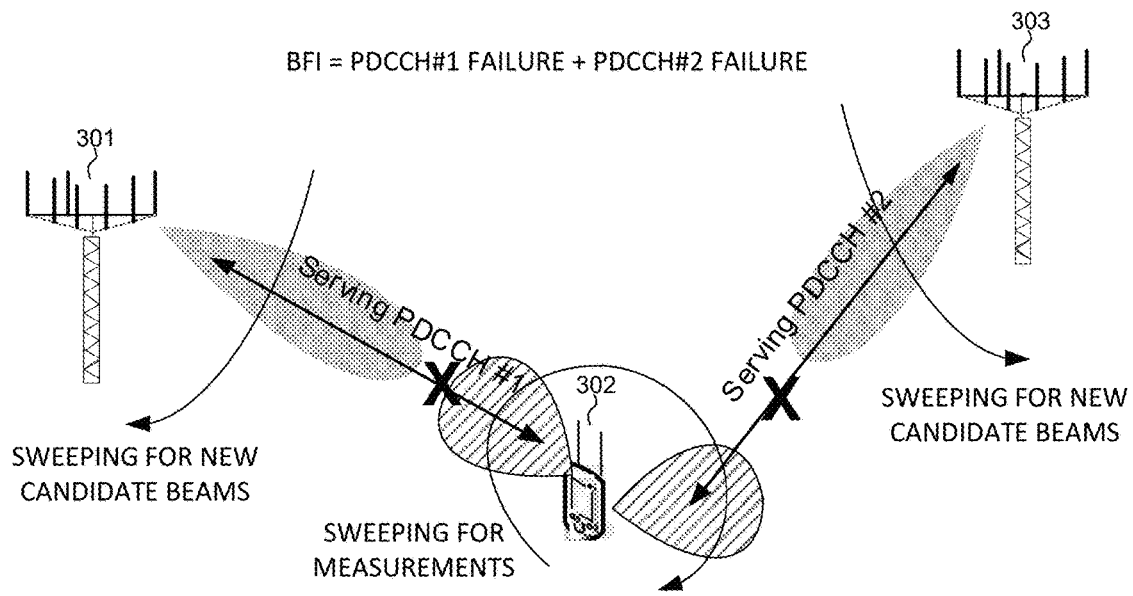
FIG. 3 illustrates examples of beam failure detection and new candidate beam identification in a beam failure recovery (BFR) mechanism.

FIG. 3 illustrates examples of beam failure detection and new candidate beam identification in a beam failure recovery (BFR) mechanism. In the example of FIG. 3, UE 302 is served by a first BPL associated with a first physical downlink control channel (PDCCH#1) from BS 301, as well as a second BPL associated with a second PDCCH#2 from BS 303. Beam failure is detected when the number of consecutive detected beam failure instances (BFIs) exceeds a maximum number. BFI is detected when link qualities of all serving BPLs for control channels are worse than a predefined threshold, e.g., when Block Error Rates (BLERs) of all serving BPLs are worse than a predefined threshold.

New candidate beam identification is based on monitoring on all or a subset of reference signals configured for a set of new candidate beams. In general, UE monitoring behavior follows similar procedure as DL beam management procedure in a multi-beam operation. BS 301 and BS 303 sweep through the set of new candidate beams—individual beam-specific reference signal resources are transmitted in TDM/FDM/CDM manner or a combination of them, where the beam-specific reference signal resources can be CSI-RS resources and/or SSB resources. UE 302 monitors qualities of combinations of BS-UE BPLs in background by sweeping through different UE beams. The quality is measured based on the beam-specific reference signal resource, where the measurement metric can be layer-1 reference signal received power (L1-RSRP). A new candidate beam is identified when a quality of a beam-specific reference signal resource corresponding to the new candidate beam is above a predefined threshold. Once a new candidate beam is identified, a UE spatial filter or a UE beam corresponding to the new candidate beam can be also determined. One or more new candidate beams can be identified by UE 302.

Figure 4:
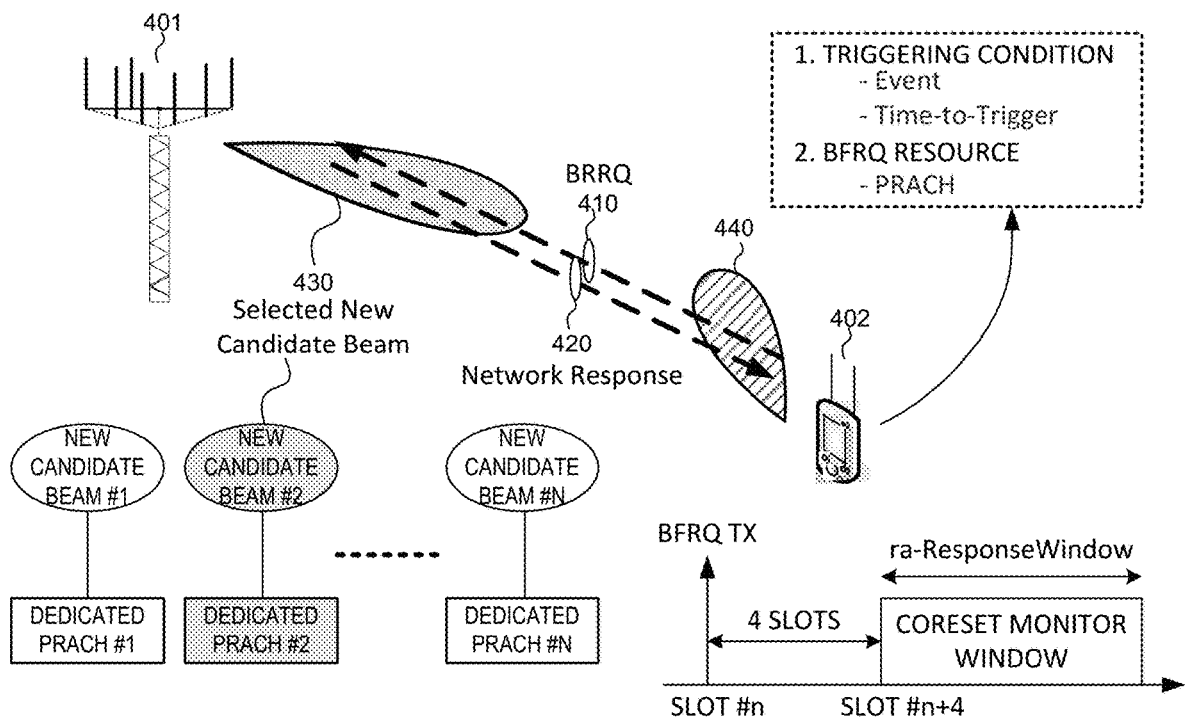
FIG. 4 illustrates examples of a BFR procedure including beam failure recovery request (BFRQ) transmission and network response in a BFR mechanism.

FIG. 4 illustrates examples of a BFR procedure including beam failure recovery request (BFRQ) transmission and network response in a BFR mechanism. A BFR procedure is initiated by UE 402 when a trigger condition is satisfied. In one embodiment, the triggering condition for initiating a BFR procedure is satisfied when beam failure is detected and at least one new candidate beam is identified. Time-to-trigger can be applied for event evaluation, i.e., event criteria should be satisfied for a certain amount of time before triggering beam failure recovery request.

Once the triggering condition is satisfied for a predefined evaluation period, UE 402 selects a new candidate beam 430 from the identified new candidate beams, e.g., new candidate beam #2, and transmits a BFRQ 410 to BS 401 over a BFRQ resource. In one embodiment, UE 402 is configured with a set of dedicated PRACH resources, and each of the dedicated PRACH resources is associated with one of the new candidate beams. UE 402 transmits a BFRQ using the dedicated PRACH resource #2 associated with the selected new candidate beam 430 using the UE beam 440 corresponding to the selected new candidate beam 430.

Upon BFRQ reception by BS 401, BS 401 transmits a network response 420 back to UE 402 and attempts connection with UE 402 in the UE-indicated candidate BPL corresponding to the selected new candidate beam 430. In one embodiment, as depicted in FIG. 4, UE 402 monitors a COntrol REsource SET (CORESET) in a specific search space set provided by RRC within a window configured by RRC (e.g., ra-ResponseWindow) after 4 slots from the slot of BFRQ transmission (e.g., slot #n) for detection of a DCI format with CRC scrambled by C-RNTI or MCS-RNTI (using the UE beam 440 corresponding to the selected new candidate beam 430). Successful reception of the network response indicates that the BFR procedure is completed.

Figure 5:
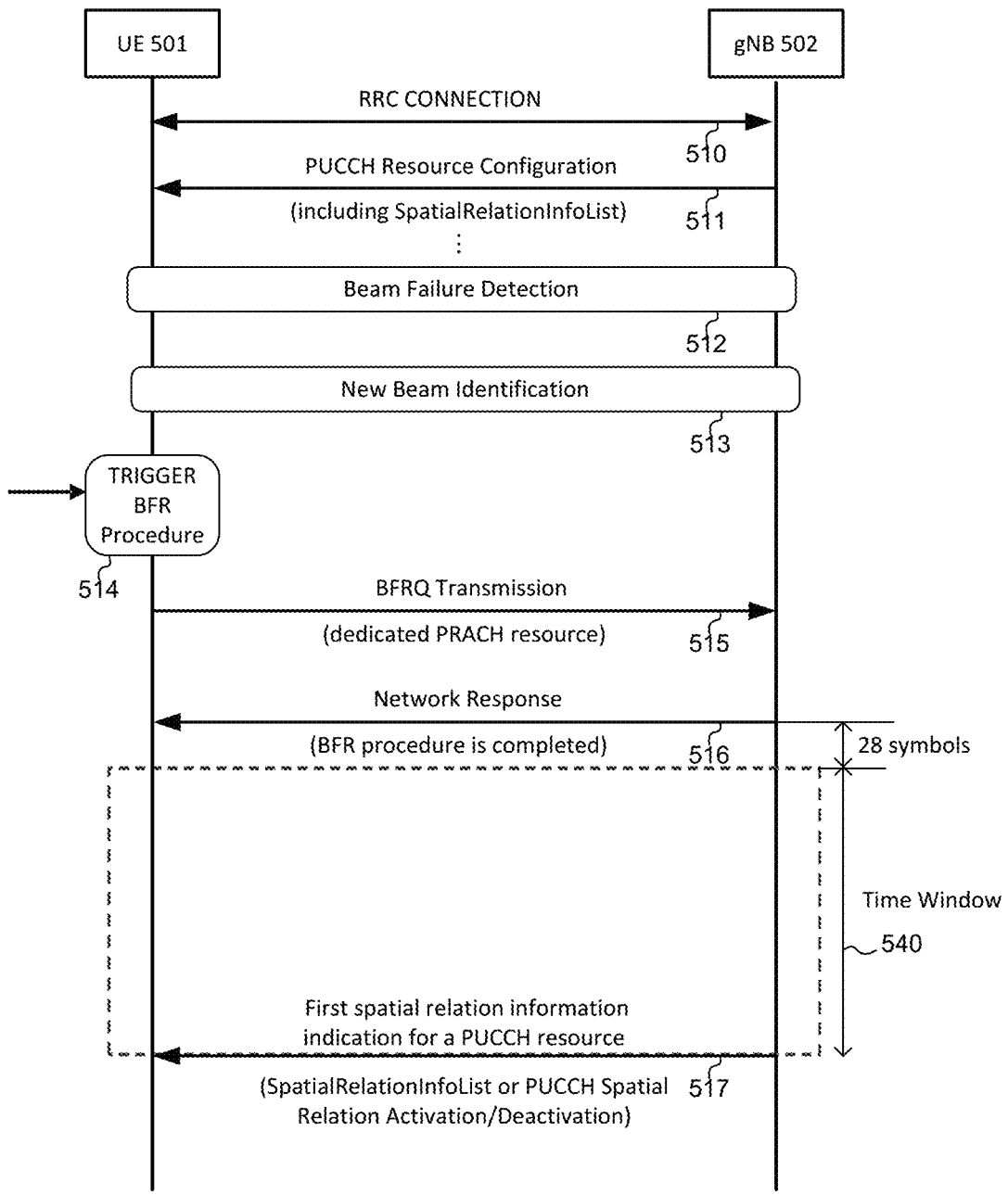
FIG. 5 illustrates one embodiment of a BFR procedure and default UL beam determination in accordance with one novel aspect.

FIG. 5 illustrates one embodiment of a BFR procedure and default UL beam determination in accordance with one novel aspect. In step 510, UE 501 is served by next generation base station gNB 502 and establishes an RRC connection for data communication. In step 511, UE 501 receives a PUCCH resource configuration including a SpatialRelationInfoList from gNB 502. Later, in step 512, UE 501 detects beam failure. In step 513, UE 501 identifies one or more new candidate beams, and triggers a BFR procedure (step 514). In step 515, UE 501 transmits a BFRQ to gNB 502, e.g., over a dedicated PRACH resource associated with a new candidate beam selected from the identified new candidate beams. In step 516, UE 501 successfully receives a network response, and the BFR procedure is completed.

After the BFR procedure is completed, UE 501 determines a default TX beam for PUCCH transmission during a time window before a first spatial relation information indication is received by UE 501. As depicted by time window 540, the time window starts after 28 OFDM symbols from the network response in step 516, and ends when the first spatial relation information indication for a PUCCH resource is received by UE 501 in step 517. During time window 540, UE 501 transmits the PUCCH using the same spatial filter as for the last PRACH transmission for BFRQ. In step 517, UE 501 is provided with a SpatialRelationInfoList via RRC signaling for the PUCCH resource, or receives an activation command for PUCCH spatial relation activation via MAC CE for the PUCCH resource. After step 517, UE 501 can derive spatial filters or the PUCCH resource from the RRC or MAC CE signaling for subsequent uplink transmission.

Figure 6:
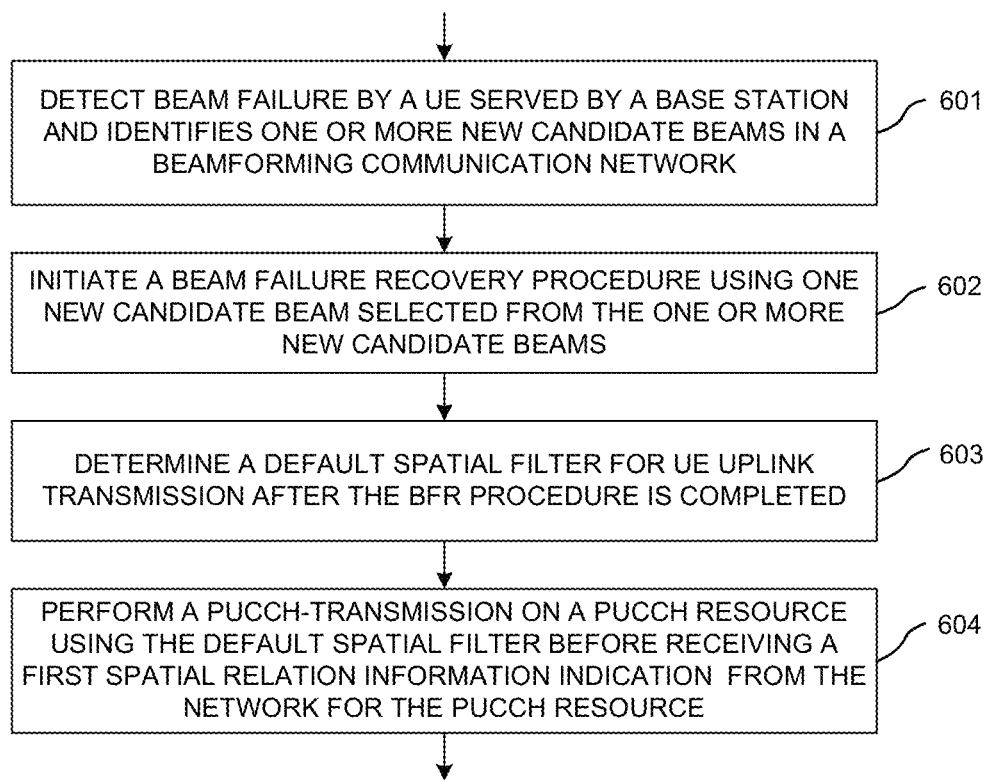
FIG. 6 is a flow chart of a method of default UL beam determination for PUCCH transmission after a BFR procedure is completed in a beamforming system in accordance with one novel aspect.

FIG. 6 is a flow chart of a method of default UL beam determination for PUCCH transmission after a BFR procedure is completed in a beamforming system in accordance with one novel aspect. In step 601, a UE detects beam failure and identifies one or more new candidate beams in a beamforming communication network. In step 602, the UE initiates a beam failure recovery (BFR) procedure using one new candidate beam selected from the one or more new candidate beams. In step 603, the UE determines a default spatial filter for uplink transmissions after the BFR procedure is completed. In step 604, the UE performs a physical uplink control channel (PUCCH)-transmission on a PUCCH resource using the default spatial filter before receiving a first spatial relation information indication from the network for the PUCCH resource.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    detecting a beam failure by a user equipment (UE) and identifying one or more new candidate beams in a beamforming communication network;
    initiating a beam failure recovery (BFR) procedure using a new candidate beam selected from the one or more new candidate beams;
    determining a default spatial filter for uplink transmissions after the BFR procedure is completed; and
    performing a physical uplink control channel (PUCCH)-transmission on a PUCCH resource using the default spatial filter before receiving a first spatial relation information indication from the network for the PUCCH resource.

2. The method of claim 1, wherein the one or more new candidate beams are identified based on measurements on reference signal resources corresponding to the one or more new candidate beams and a predefined criterion.

3. The method of claim 1, wherein a dedicated physical random-access channel (PRACH) resource is associated with each corresponding reference signal resource for the new candidate beam identification.

4. The method of claim 3, wherein the BFR procedure comprises the UE transmitting a beam failure recovery request (BFRQ) on a PRACH resource associated with a reference signal resource corresponding to the selected new candidate beam.

5. The method of claim 4, wherein a spatial filter used for transmitting the BFRQ is determined as the default spatial filter for the PUCCH-transmission.

6. The method of claim 1, wherein the BFR procedure is completed after the UE successfully receiving a network response.

7. The method of claim 6, wherein the default spatial filter is determined upon a predefined time period is passed after the BFR procedure is completed.

8. The method of claim 1, wherein the default spatial filter is used for the PUCCH-transmission during a time window from the BFR procedure is completed to the UE deriving a spatial filter for the PUCCH-transmission from the spatial relation information indication.

9. The method of claim 1, wherein spatial relation information for the PUCCH resource is carried by an RRC signaling comprising one or more spatial relations.

10. The method of claim 9, wherein a spatial relation is activated by a MAC CE when multiple spatial relations are carried by the RRC signaling.

11. A User Equipment (UE), comprising:
    a beam monitoring circuit that detects a beam failure and identifies one or more new candidate beams in a beamforming communication network;
    a beam failure recovery (BFR) handling circuit that initiates a BFR procedure using a new candidate beam selected from the one or more new candidate beams;
    a beamforming circuit that determines a default spatial filter for uplink transmissions after the BFR procedure is completed; and
    a transmitter that performs a physical uplink control channel (PUCCH)-transmission on a PUCCH resource using the default spatial filter before receiving a first spatial relation information indication from the network for the PUCCH resource.

12. The UE of claim 11, wherein the one or more new candidate beams are identified based on measurements on reference signal resources corresponding to the one or more new candidate beams and a predefined criterion.

13. The UE of claim 11, wherein a dedicated physical random-access channel (PRACH) resource is associated with each corresponding reference signal resource for the new candidate beam identification.

14. The UE of claim 13, wherein the BFR procedure comprises the UE transmitting a beam failure recovery request (BFRQ) on a PRACH resource associated with a reference signal resource corresponding to the selected new candidate beam.

15. The UE of claim 14, wherein a spatial filter used for transmitting the BFRQ is determined as the default spatial filter for the PUCCH-transmission.

16. The UE of claim 11, wherein the BFR procedure is completed after the UE successfully receiving a network response.

17. The UE of claim 16, wherein the default spatial filter is determined upon a predefined time period is passed after the BFR procedure is completed.

18. The UE of claim 11, wherein the default spatial filter is used for the PUCCH-transmission during a time window from the BFR procedure is completed to the UE deriving a spatial filter for the PUCCH-transmission from the spatial relation information indication.

19. The UE of claim 11, wherein spatial relation information for the PUCCH resource is carried by an RRC signaling comprising one or more spatial relations.

20. The UE of claim 19, wherein a spatial relation is activated by a MAC CE when multiple spatial relations are carried by the RRC signaling.

* * * * *